(12) United States Patent
Chambers et al.

(10) Patent No.: US 10,329,425 B2
(45) Date of Patent: Jun. 25, 2019

(54) BATTERIES, SEPARATORS, COMPONENTS AND COMPOSITIONS WITH HEAVY METAL REMOVAL CAPABILITY AND RELATED METHODS

(71) Applicant: Daramic, LLC, Charlotte, NC (US)

(72) Inventors: Jeffrey K. Chambers, Philpot, KY (US); Tejas R. Shah, Burlington, MA (US)

(73) Assignee: Daramic, LLC, Charlotte, NC (US)

( * ) Notice: Subject to any disclaimer, the term of this patent is extended or adjusted under 35 U.S.C. 154(b) by 49 days.

(21) Appl. No.: 15/614,740

(22) Filed: Jun. 6, 2017

(65) Prior Publication Data

US 2017/0267863 A1 Sep. 21, 2017

Related U.S. Application Data

(62) Division of application No. 13/239,440, filed on Sep. 22, 2011, now Pat. No. 9,683,101.
(Continued)

(51) Int. Cl.
*H01M 2/16* (2006.01)
*H01M 2/18* (2006.01)
(Continued)

(52) U.S. Cl.
CPC ............. *C08L 89/00* (2013.01); *H01M 2/166* (2013.01); *H01M 10/10* (2013.01); *H01M 2/18* (2013.01)

(58) Field of Classification Search
None
See application file for complete search history.

(56) References Cited

U.S. PATENT DOCUMENTS

| 4,748,093 A | 5/1988 | Turner |
| 5,478,677 A | 12/1995 | Choi et al. |

(Continued)

FOREIGN PATENT DOCUMENTS

| EP | 1533861 B1 | 5/2007 |
| JP | 2008108511 A | 5/2008 |

(Continued)

OTHER PUBLICATIONS

U.S. Appl. No. 61/253,096, filed Oct. 20, 2009, Miller et al.
(Continued)

*Primary Examiner* — Daniel S Gatewood
(74) *Attorney, Agent, or Firm* — Hammer & Associates, P.C.

(57) ABSTRACT

In accordance with at least certain embodiments of the present invention, a novel concept of utilizing PIMS minerals as a filler component within a microporous lead-acid battery separator is provided. In accordance with more particular embodiments or examples, the PIMS mineral (preferably fish meal, a bio-mineral) is provided as at least a partial substitution for the silica filler component in a silica filled lead acid battery separator (preferably a polyethylene/silica separator formulation). In accordance with at least selected embodiments, the present invention is directed to new or improved batteries, separators, components, and/or compositions having heavy metal removal capabilities and/or methods of manufacture and/or methods of use thereof.

18 Claims, 10 Drawing Sheets

Related U.S. Application Data

(60) Provisional application No. 61/385,259, filed on Sep. 22, 2010.

(51) Int. Cl.
  *H01M 10/10* (2006.01)
  *C08L 89/00* (2006.01)

(56) References Cited

U.S. PATENT DOCUMENTS

| | | | |
|---|---|---|---|
| 5,618,642 | A | 4/1997 | Samii et al. |
| 5,985,484 | A * | 11/1999 | Young .................... H01M 2/18 |
| | | | 429/143 |
| 6,217,775 | B1 | 4/2001 | Conca et al. |
| 6,991,874 | B1 | 1/2006 | Mohwald et al. |
| 7,094,498 | B2 | 8/2006 | Miller et al. |
| 2001/0003578 | A1 | 6/2001 | Fischer et al. |
| 2006/0141350 | A1 | 6/2006 | Dreyer et al. |
| 2007/0264577 | A1 * | 11/2007 | Katayama ............ H01M 2/162 |
| | | | 429/246 |
| 2008/0182933 | A1 | 7/2008 | Shimizu et al. |
| 2009/0030100 | A1 | 1/2009 | Nagamatsu et al. |
| 2012/0021272 | A1 * | 1/2012 | Kramm .................. H01M 2/14 |
| | | | 429/139 |
| 2012/0070713 | A1 | 3/2012 | Whear et al. |

FOREIGN PATENT DOCUMENTS

| | | | | |
|---|---|---|---|---|
| JP | 2008123988 A | | 5/2008 | |
| WO | WO-2009050286 A1 | * | 4/2009 | ............. H01M 2/14 |

OTHER PUBLICATIONS

U.S. Appl. No. 12/904,371, filed Oct. 14, 2010, Miller et al.
Qi Ying Ma, "In situ lead immobilization by Apatite," Environ. Sci. Technol., (vol. 27), (p. 1803-1810), (1993).
K. Ihmels et al., "Chapter 7, separator Materials for Valve-Regulated Lead-Acid Batteries," Elsevier B.V., D.A.J. Rand et al. editors, (p. 183-205), (2004).
Jorg Deiters et al., "A New Polyethylene Separator for Heavy-Duty Traction Batteries," Journal of Power Sources, 158 ed., Elsevier B.V., (p. 1069-1072), (2006).
M.L. Sorita et al., "Development of High Power VRLA Batteries Using Novel Materials and Processes," Journal of Power Sources, 5111 ed., Elsevier B.V., (p. 1-12), (2002).
M. Perrin et al., "Effect of Compression on the Behaviour of Lead-Acid Batteries," Journal of Power Sources, 4071 ed., Elsevier B.V., (p. 1-12), (2000).
M. Perrin et al., "Extending Cycle Life of Lead Acid Batteries: A New Separation System Allows the Application of Pressure on the Plate Group," Journal of Power Sources, vol. 105, Issue 2, Elsevier B.V., (p. 114-119), (Mar. 20, 2002).
J. Wright et al., "PIMS using apatite II™: How it works to remediate soil & water," Proceedings of the Conference on Sustainable Range Management, Jan. 5-8, 2004, New Orleans, LA.

* cited by examiner

BATTERIES, SEPARATORS, COMPONENTS AND COMPOSITIONS WITH HEAVY METAL REMOVAL CAPABILITY AND RELATED METHODS

CROSS-REFERENCE TO RELATED APPLICATIONS

The present application is a divisional application of U.S. patent application Ser. No. 13/239,440 filed Sep. 22, 2011, now U.S. Pat. No. 9,683,101, which claims priority to and the benefit of U.S. provisional patent application Ser. No. 61/385,259, filed Sep. 22, 2010, both hereby fully incorporated by reference herein.

FIELD OF THE INVENTION

In accordance with at least selected embodiments, the present invention is directed to new or improved batteries, separators, components, and/or compositions having heavy metal removal capabilities and/or methods of manufacture and/or methods of use thereof. In accordance with at least certain possibly preferred embodiments, the present invention is directed to new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and/or methods of manufacture and/or methods of use thereof. In accordance with at least possibly more preferred particular embodiments, the present invention is directed to new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and utilizing at least one PIMS mineral as at least one filler component therein. In accordance with at least one particular microporous lead-acid battery separator embodiment, the PIMS mineral (preferably fish meal, a bio-mineral) is provided as at least a partial substitution for the silica filler component in a silica filled lead acid battery separator (preferably a polyethylene/silica separator formulation). In accordance with at least certain embodiments or examples, the invention is directed to battery separators, to methods of manufacture of battery separators, to methods of use of battery separators, to improved battery separators, and/or to improved separators or laminates for lead acid batteries.

BACKGROUND OF THE INVENTION

A group of inorganic (mineral) compounds are known to effectively bind heavy metals such as lead, cadmium, iron, zinc, and copper. The mechanism by which the minerals bind heavy metals is termed "Phosphate Induced Metal Stabilization" (PIMS) and is widely utilized for the environmental remediation of heavy metals from contaminated soils and water. In environmental remediation applications, bulk quantities of minerals possessing PIMS affinity for toxic metals are mixed with contaminated soil or contained within a housing whereby contaminated water may perfuse through the bulk PIMS mineral cake to reduce heavy metal contamination.

A common failure mode within the lead-acid (or lead-calcium) battery industry is the phenomenon of "hydration shorts". This type of short circuit is typically formed in batteries when they are allowed to stay at very low acid concentrations (low charge) for an extended period of time. In a charged state, the acid density is high (for example, 1.28 g/cm$^3$) and the solubility of lead sulfate is low. At low charge, the acid density decreases and the solubility of lead sulfate increases. At low charge, lead sulfate ($PbSO_4$), from the electrode plates, enters into the electrolyte solution (sulfuric acid $H_2SO_4$). Upon recharging, lead sulfate is precipitated and can form a layer on the bottom of many of the separator pores (the separator pores are large compared to the ionic radii of lead and sulfate). Upon additional recharging of the battery and contact with the negative electrode of the battery, the precipitated lead sulfate can be reduced to lead and thousands of microshorts between the electrodes can be generated (hydration shorts and battery failure).

Typically, this "hydration shorts" phenomenon occurs when a battery encounters a slow discharge as in the case of storage over extended periods without maintenance of charge. The conventional approach to the prevention of hydration shorts consists of addition of sodium sulfate ($Na_2SO_4$) to the electrolyte solution during battery manufacture. This approach requires an additional manufacturing step, the addition of sodium sulfate to the electrolyte, and adds complexity to the battery processing. Sodium sulfate addition acts to "hinder" hydration shorts via the Common Ion Effect but does not address the root cause (soluble lead generation).

As such, there exists a need for new or improved battery separators and the like for particular battery applications, particular uses, and/or for addressing, reducing or eliminating the phenomenon of "hydration shorts" in lead acid batteries.

SUMMARY OF THE INVENTION

In accordance with at least selected embodiments, the present invention addresses the need for new or improved battery separators and the like for particular battery applications, particular uses, and/or for addressing, reducing or eliminating the phenomenon of "hydration shorts" in lead acid batteries.

In accordance with at least selected embodiments, the present invention addresses, provides or is directed to new or improved batteries, separators, components, and/or compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and utilizing at least one PIMS mineral as at least one filler component therein; a silica filled lead acid battery separator wherein a PIMS mineral (preferably ground fish meal, a bio-mineral) is provided as at least a partial substitution for the silica filler component in the silica filled lead acid battery separator (preferably a polyethylene/silica separator formulation); and/or the like.

In accordance with at least selected embodiments, the present invention addresses, provides or is directed to new or improved batteries, separators, components (such as battery casings, battery parts, porous bags, laminates, coatings, surfaces, fillers, electrochemically active electrode formulations, electrolytes, and/or the like), and/or compositions having heavy metal removal capabilities utilizing at least one source of natural or synthetic hydroxyapatite having heavy metal binding capabilities, such as a PIMS mineral, and/or methods of manufacture and/or methods of use thereof.

In accordance with at least selected possibly preferred embodiments of the present invention, a believed novel concept of utilizing PIMS minerals as a filler component within a microporous lead-acid battery separator is provided. In accordance with one particular possibly more preferred embodiment or example, the PIMS mineral (preferably fish meal, a bio-mineral) is provided as at least a partial substitution for the silica filler component in contemporary silica filled lead acid battery separator (preferably a polyolefin/silica or polyethylene/silica/oil separator formulation).

In accordance with selected embodiments or aspects of the present invention, a variety of "Phosphate Induced Metal Stabilization" (PIMS) minerals have been identified; some of which have been evaluated for lead affinity. A PIMS mineral derived from fish bone (such as commercial, lab ground fish meal) has been shown to have greatest affinity for lead ion over the other samples evaluated. The fish bone powder was extruded via pilot operation into a typical lead-acid battery separator format at several loading concentrations. The resulting PIMS incorporating separator was evaluated for lead removal efficiency; the separator demonstrated substantial reduction of lead concentration in acidic solution. For example, % Pb reductions of about 17% to 100% were demonstrated. In accordance with at least certain embodiments, it is preferred that the fish bone powder be added to substitute for a portion of the silica filler at substitution levels of about 1% to 20% of the silica, more preferably about 2% to 10%, and most preferably at about 2% to 5%. In accordance with at least other certain embodiments, it is preferred that the ground fish bone powder (ground fish meal) be added to substitute for a portion of the silica filler at substitution levels of about 1% to 50% or more of the silica, more preferably about 5% to 30%, and most preferably at about 10% to 20%.

It is believed that this is the first commercial use of a bio-mineral in a battery separator, in an extruded polyolefin polymer resin, and in a porous polymer film or membrane.

In accordance with at least selected embodiments, lead reduction is achieved by incorporating PIMS minerals in lead-acid battery separators, preferably incorporating PIMS mineral derived from fish bone.

The present invention represents a novel or improved microporous membrane substrate with chemically active properties. A range of various chemically active or reactive mineral fillers are available and amenable to the separator extrusion and extraction process. These minerals are available at low cost in desired purity and in the case of fish bone are industrial by-products available from multiple sources. Advantages include low cost of raw material as well as streamlining existing battery production processes involving sodium sulfate.

The preferred separators of the present invention are microporous materials (e.g. pores less than 1 micron). Nonetheless, other materials such as porous or macroporous materials are contemplated. For example, macroporous separators (e.g. pores greater than 1 micron) would include separators made from rubber, PVC, synthetic wood pulp (SWP), glass fibers, cellulosic fibers, polypropylene, and combinations thereof.

In accordance with at least selected embodiments, the present invention is directed to other components and/or compositions having heavy metal removal capabilities and/or methods of manufacture and/or methods of use thereof. In accordance with at least certain possibly preferred embodiments, the present invention is directed to new or improved lead acid battery components (such as battery casings, battery parts, porous bags, laminates, coatings, surfaces, fillers, electrodes, electrolytes, and/or the like) and/or polymer or resin compositions having heavy metal removal capabilities and/or methods of manufacture and/or methods of use thereof. In accordance with at least possibly more preferred particular embodiments, the present invention is directed to such new or improved lead acid battery components (such as battery casings, battery parts, porous bags, laminates, coatings, surfaces, fillers, electrodes, electrode formulations, electrolytes, and/or the like) and/or polymer or resin compositions utilizing at least one PIMS mineral as at least one filler component therein. In accordance with at least one particular embodiment, the PIMS mineral (preferably ground fish meal, a bio-mineral) is provided as at least a partial substitution for the silica filler component in a silica filled polymer composition, such as a polyolefin/silica composition, for example, in a polyethylene/silica/oil formulation suitable for slot die extrusion.

In accordance with at least certain other embodiments or examples, the invention is directed to new or improved batteries, separators, components, and/or compositions having lead removal, binding, bonding, absorbing, retaining, and/or scavenging capabilities and/or methods of manufacture and/or methods of use thereof.

In accordance with at least selected objects of the present invention, there is provided new or improved batteries, separators, components, and/or compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrodes, electrolytes, and/or the like) and/or polymer or resin compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrodes, electrode formulations, electrolytes, and/or the like) and/or polymer or resin compositions having heavy metal removal capabilities and utilizing at least one source of natural and/or synthetic hydroxyapatite having heavy metal binding capabilities, preferably having at least one PIMS mineral as at least one filler component therein; particular microporous lead-acid battery separator embodiments wherein the PIMS mineral (preferably fish meal, a bio-mineral) is provided as at least a partial substitution for the silica filler component in a silica filled lead acid battery separator (preferably a polyethylene/silica separator formulation); battery separators, to methods of manufacture of battery separators, to methods of use of battery separators, to improved battery separators, and/or to improved separators or laminates for lead acid batteries; and/or the like.

BRIEF DESCRIPTION OF THE DRAWINGS

For the purpose of illustrating at least selected embodiments, features and/or aspects of the invention, there is shown in the drawings one or more forms that may be presently preferred; it being understood, however, that the embodiments, features and/or aspects of the invention are not limited to the precise arrangements and instrumentalities shown.

DETAILED DESCRIPTION

Figure 1:
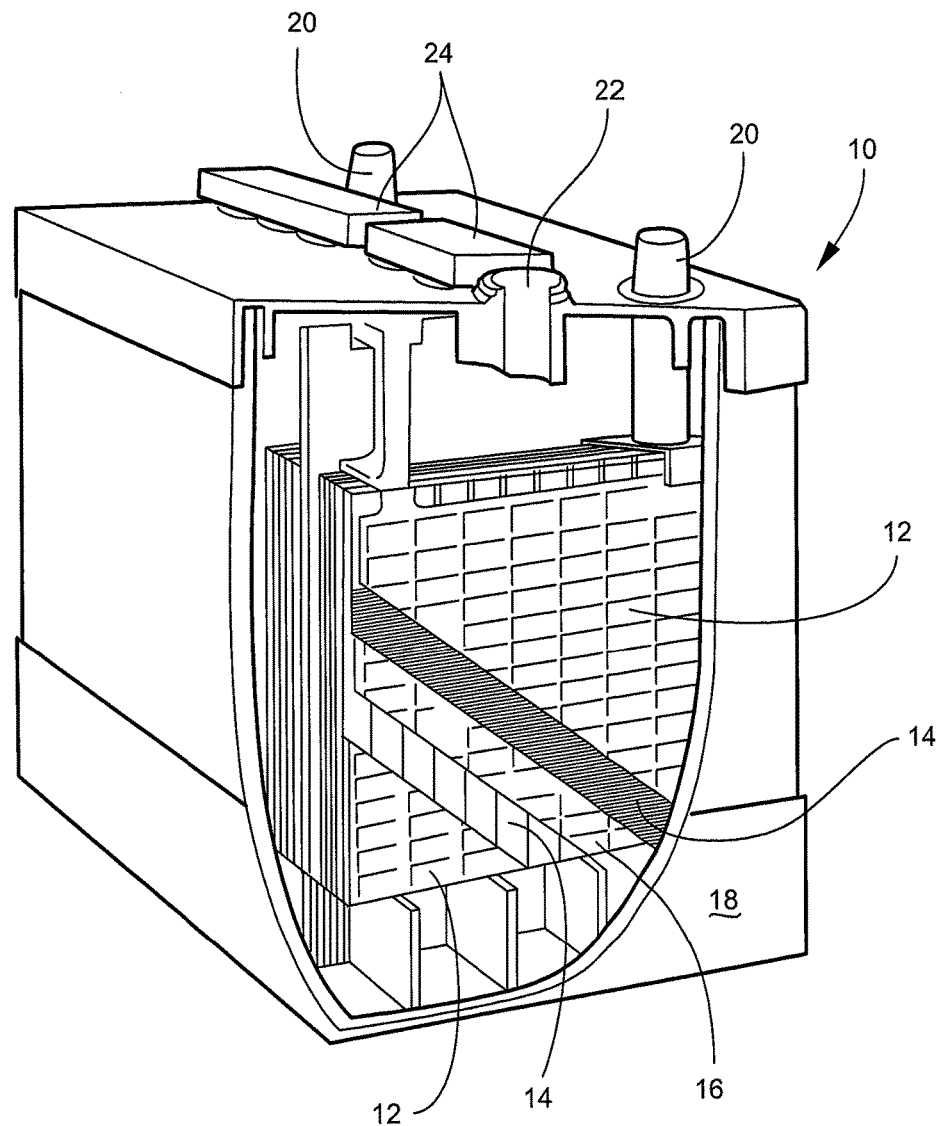
FIG. 1 is a schematic perspective view representation of an exemplary lead acid battery, with parts broken away, illustrating a placement of at least one possibly preferred embodiment of the present separator therein.

In accordance with at least selected embodiments, the present invention is directed to new or improved batteries, separators, components, and/or compositions having heavy metal removal capabilities and/or methods of manufacture and/or methods of use thereof. In accordance with at least certain possibly preferred embodiments, the present invention is directed to new or improved lead acid batteries, lead acid battery separators (single or multi-layer), lead acid battery components (such as battery casings, battery parts, porous bags, laminates, coatings, surfaces, fillers, electrodes, electrode formulations, electrolytes, and/or the like) and/or polymer or resin compositions having heavy metal removal capabilities and/or methods of manufacture and/or methods of use thereof. In accordance with at least possibly more preferred particular embodiments, the present invention is directed to new or improved lead acid batteries, lead acid battery separators (single or multi-layer), lead acid battery components (such as battery casings, battery parts, porous bags, laminates, coatings, surfaces, fillers, electrodes, electrode formulations, electrolytes, and/or the like) and/or polymer or resin compositions having heavy metal removal capabilities and utilizing at least one source of natural or synthetic hydroxyapatite having heavy metal binding capabilities, preferably at least one PIMS mineral as at least one filler or component therein or thereon. In accordance with one particular microporous lead-acid battery separator embodiment or example, the PIMS mineral (preferably fish meal, a bio-mineral) is provided as at least a partial substitution for the silica filler component in a silica filled lead acid battery separator (preferably a polyethylene/silica separator formulation).

In accordance with at least selected embodiments of the present invention, a believed novel concept of utilizing "Phosphate Induced Metal Stabilization" (PIMS) minerals as a filler component within a microporous lead-acid battery separator is provided. In accordance with one particular embodiment or example, the PIMS mineral (preferably fish meal, a bio-mineral) is provided as at least a partial substitution for the silica filler component in contemporary silica filled lead acid battery separator (preferably a polyethylene/silica separator formulation).

As mentioned above, a common failure mode within the lead-acid battery industry is the phenomenon of "hydration shorts". In accordance with at least selected embodiments, the present invention is directed to new or improved batteries, separators, components, and/or compositions having heavy metal removal capabilities that address, delay, reduce, or eliminate the phenomenon of "hydration shorts".

In accordance with the present invention, a variety of PIMS minerals have been identified and some of which have been evaluated for lead affinity (see Tables I and II below). A PIMS mineral derived from fish bone (such as commercial, lab ground fish meal) has been shown to have the greatest affinity for lead ion over the other samples evaluated. The fish bone or fish meal powder was extruded via pilot operation into a typical lead-acid battery separator format at several loading concentrations. The resulting PIMS incorporating separator was evaluated for lead removal efficiency; the separator demonstrated substantial reduction of lead concentration in acidic solution. For example, % Pb reductions of about 17% to 100% were demonstrated. It is preferred that the fish bone powder be added to substitute for the silica filler at substitution levels of about 1% to 20% of the silica, more preferably about 2% to 10%, and most preferably at about 2% to 5%. In accordance with at least other certain embodiments, it is preferred that the ground fish bone powder (ground fish meal) be added to substitute for a portion of the silica filler at substitution levels of about 1% to 50% or more of the silica, more preferably about 5% to 30%, and most preferably at about 10% to 20%.

It is believed that this is the first commercial use of a bio-mineral in a battery separator, in an extruded polyolefin polymer resin, and in a porous polymer film or membrane.

In accordance with at least selected embodiments, lead reduction is achieved by incorporating PIMS minerals in lead-acid battery separators, preferably incorporating PIMS mineral derived from fish bone.

The present invention represents a novel microporous membrane substrate with chemically active properties. A range of various chemically active or reactive mineral fillers are available and amenable to the separator extrusion and extraction process. These minerals are available at low cost in desired purity and in the case of fish bone (or fish meal) are industrial by-products available from multiple sources. Advantages include low cost of raw material as well as identified battery manufacturer need to streamline existing production processes involving sodium sulfate.

The preferred separators are microporous materials (e.g. porous less than 1 micron). Nonetheless, other materials such as porous or macroporous materials are contemplated. For example, macroporous separators (e.g. pores greater than 1 micron) would include separators made from rubber, PVC, synthetic wood pulp (SWP), glass fibers, cellulosic fibers, polypropylene, and combinations thereof.

In accordance with at least selected embodiments, the battery may be a lead acid or lead calcium battery such as a vented or flooded lead acid battery, enhanced flooded lead acid battery (EFB), valve-regulated lead-acid (VRLA) battery, low-maintenance lead-acid rechargeable battery, absorbed glass mat (AGM) battery, VRLA AGM battery, gel battery (gel cell), VRLA gel battery, sealed lead-acid battery, recombinant battery, polymer battery, carbon lead acid battery, or other battery, capacitor, super capacitor, accumulator, battery/capacitor combination, and/or the like. The preferred battery is a vented or flooded lead acid battery.

In accordance with at least selected embodiments, the battery separator may be a lead acid or lead calcium battery separator, such as a flexible or rigid separator, a pocket, envelope, sheet, piece or leaf separator, a single or multi-layer separator, a composite or laminate separator, a separator for a vented or flooded lead acid battery, enhanced flooded lead acid battery (EFB), valve-regulated lead-acid (VRLA) battery, low-maintenance lead-acid rechargeable battery, absorbed glass mat (AGM) battery, VRLA AGM battery, gel battery (gel cell), VRLA gel battery, sealed lead-acid battery, recombinant battery, polymer battery, carbon lead acid battery, or other battery, capacitor, super capacitor, accumulator, battery/capacitor combination, and/or the like. The preferred battery separator is a vented or flooded lead acid battery separator.

Hydroxyapatite is a mineral with demonstrated heavy metal binding capabilities. Hydroxyapatite can be produced synthetically and purified as a nano-crystalline material. Hydroxyapatite is found within the skeletal mass of many naturally occurring plants and animals (as well as a minor constituent of naturally occurring minerals such as kaolinite). The most common animal-derived sources of hydroxyapatite are aquatic (fish, crustaceans, shellfish) and land-based from bovine and porcine sources. The most common plant-derived sources of hydroxyapatite occur in tea, kelp and various species of tree bark. As with all natural products, varying degrees of purity and potency may be expected. As an example, fish meal is commercially available in a range of purities based upon the level of digestion of non-skeletal remains. That is, fish meal may contain high amounts of protein from fleshy components that remain; this may be termed "high-nitrogen" fish meal. Fish meal that has been fully processed to fully digest proteinaceous matter, leaving skeletal content intact may be termed "high-phosphorus" fish meal.

Most animal and plant derived sources of hydroxyapatite are commercially supplied as coarse granular materials. In accordance with at least one embodiment, aspect or example of the present invention, in order to efficiently make use of the hydroxyapatite-bearing materials it is desirable to perform a milling (or grinding) operation to reduce the particle size and increase the effective surface area in an effort to promote optimal exposure of the heavy metal to the hydroxyapatite. The milling operation also promotes ease of particle incorporation into the battery by, for example, membrane extrusion, impregnating, coating, laminating, molding, sachet fabrication, or combinations of these technologies. It is preferred, for example, to achieve a D50 particle size of between 10 μm to 80 μm to achieve optimal condition for the incorporation of ground fish meal into a battery separator via twin screw extrusion methodology. The aforementioned particle size range is also desirable when incorporating natural hydroxyapatite materials into nonwoven laminate-separator structures, impregnating, coating, molding, and bulk powder sachet-type delivery methods.

In accordance with at least selected embodiments of the present invention, it is preferred to compound the hydroxyapatite source (i.e. ground or milled fish meal) into the separator extrusion formulation (such as a polymer/silica/fish meal formulation or a polymer/silica/fish meal/oil formulation). Separators produced in this way offer the desired electrochemical performance attributes of known lead acid battery separators but surprisingly surpass the conventional separator capabilities by actively sequestering lead in solution. In deep discharge condition, the electrolyte contains an elevated level of reduced lead passing through the tortuous separator matrix and in accordance with at least selected embodiments of the present invention the separator comprises extrusion immobilized hydroxyapatite (fish meal) to sequester elemental lead prior to migration to the negative electrode. Therefore, in accordance with at least selected possibly preferred embodiments, sources of hydroxyapatite are preferably immobilized by incorporation into the separator extrusion process to exploit surface area contact probability and proximity to the electrode requiring protection.

Another approach to the incorporation of hydroxyapatite into the separator and/or battery is the inclusion of the reactive mineral into a laminate mat which is adjacent to the separator and/or attached to the separator by attachment means such as welding, spot welding, ultrasonic welding, adhesive, heat, heat and pressure, or other known processes. The laminate may be a glass mat and the fish meal or other source of hydroxyapatite may be mixed with a binder utilized during formation of the glass mat, coated on the mat, and/or impregnated in the mat. The fish meal or other source of hydroxyapatite may be co-extruded with the resin during the fiberization process thus allowing for inclusion into "carded" dry process non-wovens as well as wet-laid processes. Alternatively, the fish meal or other source of hydroxyapatite may also be used within synthetic non-woven materials, such as PBT, PET, PP, and/or the like by means of addition to the binder and/or by direct addition to the furnish prior to wet-lay fiber formation. This method also has utility in adding fish meal or other source of hydroxyapatite to cellulosic laminates such as "pasting papers". One or more sources of hydroxyapatite may also be incorporated on or in the separator by means of, for example, coated adhesion (after separator formation), direct inclusion (during formation), to both inorganic and organic fibrous laminate materials in contact with the separator, and/or combinations thereof.

Another approach to the incorporation of hydroxyapatite (such as ground fish meal) is to coat the fish meal directly to the positive and/or negative surface of the separator. An example of this method is to produce a slurry of the desired concentration, coat the positive or negative surface with the slurry by known coating means (dip, spray, roller, nip, etc.) and subsequently dry the slurry-separator article to insure immobilization of the fish meal during any prerequisite separator processing steps prior to the battery build and formation. Therefore, sources of hydroxyapatite can be applied by mixing with a vehicle, for example water (or other solvent or binder), to produce a slurry or mixture suitable for the application of a surface coating (preferably a porous coating).

Another approach to the incorporation of hydroxyapatite into the energy storage device is by compounding the reactive mineral, (e.g. fish meal), into the resin utilized in producing the container hardware for the battery itself (the case, supports, dividers, cover, and/or the like). Thus, some level of contact over time may occur with electrolyte solution and the surface of the resin case, supports, dividers, top the process of applying the active material to the electrode grids may be modified to include the addition of fish meal or other hydroxyapatite material (the reactive mineral may be included in the electrochemically active electrode formulations). Finally, hydroxyapatite may also have utility as an additive later in the life of the battery, for example, after a suggested service interval the battery is injected with a level of hydroxyapatite to increase service life through continued protection against depolarization of the negative electrode (and prevention of "hydration shorts").

In accordance with selected examples and testing of hydroxyapatite materials, the following Table I illustrates the unexpected results achievable with even low loading of hydroxyapatite (such as fish meal). For example, a 10% loading of fish meal as a substitution for silica filler in the battery separator of Sample G showed an amazing 72.6% reduction in lead in the 20 ml Pb solution.

TABLE I

| Sample | Composition | weight (g) | solution (ml) | Pb (mg/L) | % Change |
|---|---|---|---|---|---|
| A | Pb Standard Solution As received (~100 ppm from vendor) | N/A | 20 | 114 | Control |
| B | Hydroxyapatite mineral powder (Aldrich Reagent grade) | 0.7 | 20 | 0.614 | 99.5 |
| C | Calcium Phosphate tribasic powder (Aldrich) | 0.7 | 20 | 0.43 | 99.6 |
| D | Fish Meal (Commercial, lab ground) | 0.7 | 20 | 0.002 | 100.0 |
| E | Polyethylene separator w/ Si:PE ratio of 2.6:1 (CONTROL) | 1.0 | 20 | 91.3 | 19.9 |
| F | Polyethylene separator as "E", above w/ 5% fish meal substituted for silica. | 1.0 | 20 | 94.6 | 17.0 |
| G | Polyethylene as "E", above but w/ 10% fish meal substituted for silica. | 1.0 | 20 | 31.2 | 72.6 |

Notes:
All samples were soaked without agitation in the Pb standard solution for 4 days prior to analysis at testing service.
The Pb standard solution (Fisher Scientific) is comprised of ~100 ppm (mg/L) Pb in a solution of Nitric acid and water. pH = 1-2
All solution samples were filtered free of particulate at testing service prior to testing.

cover and associated parts comprising the battery compartment. Additionally, parts comprising the battery compartment may be injection molded in such a way as to incorporate active material (the reactive mineral) such as fish meal into the inner or interior surfaces thereof at relatively elevated concentrations; this is generally referred to as "in-molding". Further, sachet devices whereby the hydroxyapatite is contained as a bulk powder within a porous, non-woven, paper, and/or plastic enclosure or another design allowing for the storage of hydroxyapatite in free electrolyte solution can be utilized to rapidly or over time release the active agent (reactive mineral) into the electrolyte (such as fish meal impregnated glass fiber, glass mat or other non-woven packing material, time release beads, a gel containing the reactive mineral, etc.). The direct inclusion of the hydroxyapatite in the electrolyte bulk storage may be utilized to provide a fixed dose of the ingredient during electrolyte filling immediately prior to battery formation or at any time during the battery manufacturing process. It is also possible to mix the hydroxyapatite (such as fish meal) into the electrochemically active material coating which is applied to the positive and negative electrodes respectively. The process of preparing the active material chemistries and The Sample E control separator (silica filled) showed a 19.9% reduction in Pb. However, the control separator data is subject to the reversible adsorptive removal mechanism of precipitated silica. As silica content is substituted for by the hydroxyapatite source (Sample F), the adsorptive mechanism is gradually disrupted and eventually replaced by the PIMS sequestration binding mechanism (Sample G). In other words, the reductions in Pb in Samples F and G are permanent binding (sequestration) as compared to temporary adsorption by Sample E.

The Sample B, C and D powdered (neat) samples were readily wet-out and immersed within the Pb assay solution; complete contact of powder to solution was observed.

The Sample E, F and G separator membrane samples were treated with a commercially available surfactant at levels comparable to that utilized for typical lead-acid battery separators.

All separator membrane samples readily wet-out and immersed within the Pb assay solution; complete contact to the surface and underlying pores was observed.

Figure 10:
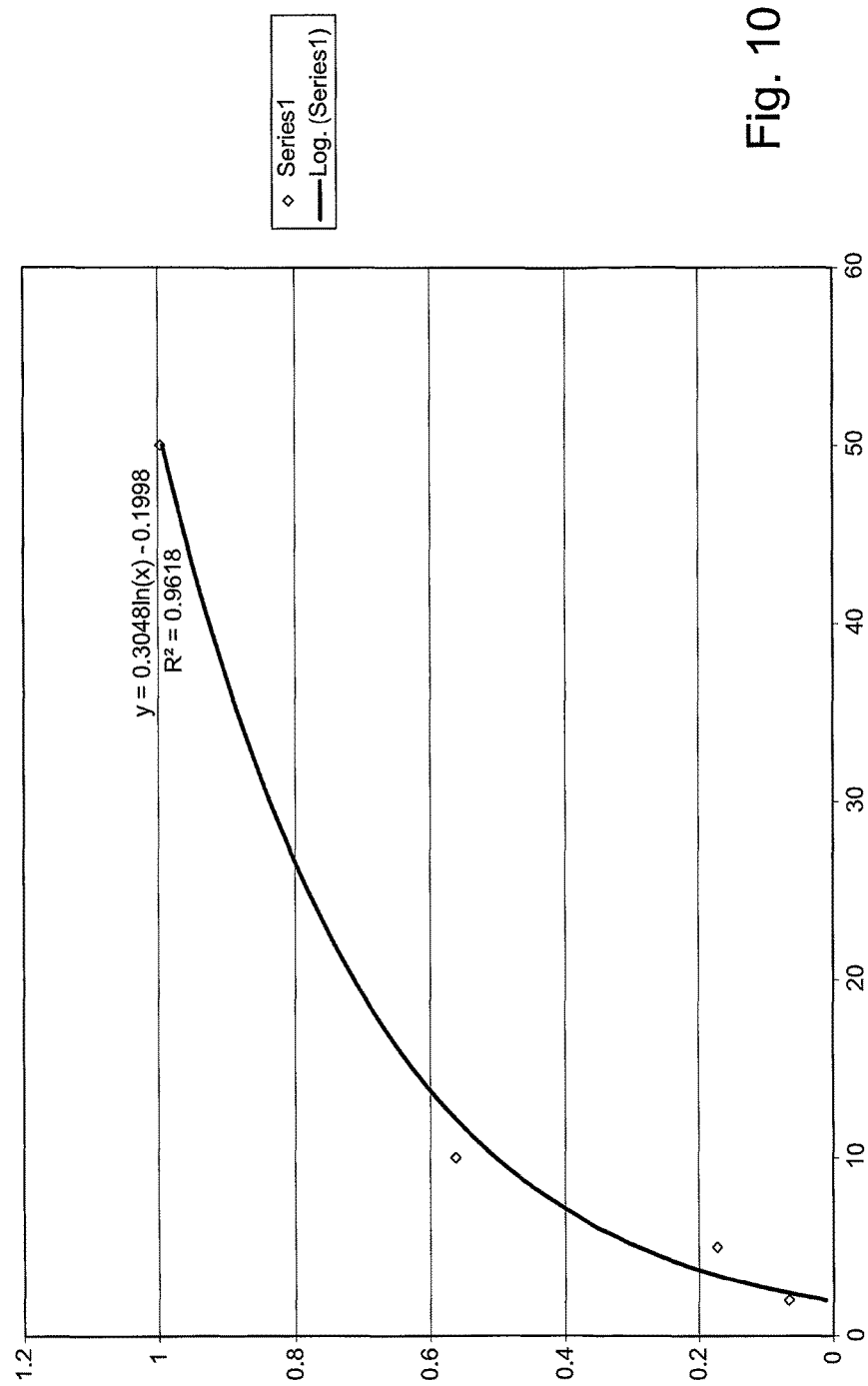
FIG. 10 is a schematic graphical representation of a fish meal loading curve showing the effectiveness of the fish meal in comparison to the loading of the fish meal in % of ground fish meal substituted for silica filler. The log based curve is based on data in Table II and shows a step increase in effectiveness from about 2% to 20% loading.

In accordance with other selected examples and testing of hydroxyapatite materials, the following Table II (and the curve of FIG. 10) illustrates the surprising results achievable with even low loading of hydroxyapatite filler (such as fish meal). For example, a 10% loading of fish meal as a substitution for silica filler in the battery separator of Sample L showed an unexpected 56.2% reduction in lead in the 20 ml Pb solution, while a 50% loading of fish meal as a substitution for silica filler in the battery separator of Sample M showed an amazing 99.6% reduction (substantially complete elimination) in lead in the 20 ml Pb solution. The Pb reduction results of Samples J to M are the data points in FIG. 10.

The Samples E to M separator membrane samples were treated with a commercially available surfactant at levels comparable to that utilized for typical lead-acid battery separators.

All separator membrane samples readily wet-out and immersed within the Pb assay solution; complete contact to the surface and underlying pores was observed.

The Pb assay test method was carried out via ICP/MS EPA Method 200.8

TABLE II

| Sample ID | Actual ID | Weight (g) | Pb Standard (ml) | Pb Concentration Theoretical (ppm) | Pb Concentration Post Exposure (ppm) | Reduction in Control Pb Post Exposure (%) |
|---|---|---|---|---|---|---|
| A | Control Pb Standard | N/A | 20 | 100 | 95.4 | N/A Control |
| B | Hydroxyapatite Synthetic Mineral | 0.11 | 20 | 100 | 0.7 | 99.3% |
| C | Commercial Fish Meal Powder (High Phosphorous Type) | 0.11 | 20 | 100 | 0.1 | 99.9% |
| D | Commercial Beef Bone Meal Powder | 0.11 | 20 | 100 | 82.1 | 13.9% |
| E | Control Separator I (CSI) | 1.6 | 20 | 100 | 80.7 | 15.4% |
| F | 2% Beef Meal (CSI) | 1.6 | 20 | 100 | 90.9 | 4.7% |
| G | 5% Beef Meal (CSI) | 1.6 | 20 | 100 | 84.9 | 11.0% |
| H | 10% Beef Meal (CSI) | 1.6 | 20 | 100 | 82.5 | 13.5% |
| I | Control Separator II (CSII) | 1.6 | 20 | 100 | 72.6 | 23.9% |
| J | 2% Fish Meal (CSII) | 1.6 | 20 | 100 | 89.1 | 6.6% |
| K | 5% Fish Meal (CSII) | 1.6 | 20 | 100 | 78.9 | 17.3% |
| L | 10% Fish Meal (CSII) | 1.6 | 20 | 100 | 41.8 | 56.2% |
| M | 50% Fish Meal (CSII) | 1.6 | 20 | 100 | 0.3 | 99.6% |
| N | Commercial Loose Tea Leaves | 0.11 | 20 | 100 | 80.5 | 15.6% |

The Samples E and I control separators (silica filled ~70%) showed respective 15.4% and 23.9% reductions in Pb. However, the control separator data is subject to the reversible adsorptive removal mechanism of precipitated silica. As silica content is substituted for by the fish meal hydroxyapatite source (Samples J and K), the adsorptive mechanism is gradually disrupted and eventually replaced by the PIMS sequestration binding mechanism (Samples L and M). In other words, the reductions in Pb in Samples L and M are permanent binding (sequestration) as compared to temporary adsorption by Samples E and I.

The Samples B, C, D and N powdered (neat) samples were readily wet-out and immersed within the Pb assay solution; complete contact of powder to solution was observed.

All samples were static soaked without agitation for a period of 48-72 hours.

The phosphorus level of all samples Post Exposure was tested and found to be below max acceptable levels.

A group of inorganic (mineral) compounds are known to effectively bind heavy metals such as lead, cadmium, iron, zinc and copper. The mechanism by which the minerals bind heavy metals is termed "Phosphate Induced Metal Stabilization" (PIMS) and is widely utilized for the environmental remediation of contaminated soils and water. In environmental application, bulk quantities of minerals possessing PIMS affinity for toxic metals are mixed with contaminated soil or contained within a housing whereby water may perfuse through the bulk mineral cake.

In accordance with certain improved environmental remediation embodiments of the present invention, we propose the novel concept of adding at least one source of hydroxyapatite (HA) or hydroxylapatite (such as synthetic and/or natural hydroxyapatite, preferably PIMS minerals, more preferably ground fish bone or meal) to a high surface area polymer structure, preferably a porous polymer membrane, more preferably a microporous polyolefin membrane (flat sheet or hollow fiber), most preferably a microporous polyethylene membrane utilizing PIMS minerals as a filler, preferably as a partial substitution for the silica filler component of a silica filled microporous polyethylene membrane. The hydroxyapatite mineral filled membrane can be used as a filter medium, packing, liner, or the like to facilitate removal of heavy metals from contaminated liquids such as water.

In accordance with at least selected embodiments of the present invention, new or improved batteries, separators, components, and/or compositions have heavy metal removal capabilities via chemically active properties provided by one or more chemically active or reactive, natural or synthetic, mineral fillers, particles, coatings, agents, and the like, preferably bio-minerals from bone or teeth, more preferably fish bone or meal. Such new or improved batteries, separators, components, and/or compositions have advantages of low cost of raw material, lead removal, reducing the need for sodium sulfate, extending battery warranty, use of recycled or industrial waste or by products, and/or the like.

In accordance with at least selected embodiments of the present invention, we have:
  Incorporated a material compatible with current separator production processes into battery separators to systematically bind Pb in solution and reduce the occurrence of hydration shorts over the battery service life.
  Incorporated a material from common (and renewable) sources:
    Fish (Most efficient at low to very low pH)
      Bones
      Scales
    Crustaceans (Functional range similar to fishmeal)
      Exoskeleton
    Shellfish (Most efficient in basic conditions above pH 8.5)
      Shell
    Beef (Functional range similar to fish meal)
      Bones
    Peat (Functional range near neutral pH)
      Humus, decayed vegetative matter.
    Tea Waste (Functional range near neutral pH)
      By-products of tea manufacturing, stems, undesired leaves.
  Identified possibly preferred fish meal as from "pelagic" fish species.
    Small, bony fish often considered inedible by humans.
    Shellfish may also make up a minor component.
    Fish meal is essentially the bone and scale after purification, wash, dry and grinding.
      Typically between 4 and 6% residual oil remains with the fishmeal.
      The fishmeal is comprised of the mineral Apatite w/formula:
        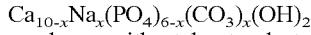
        $Ca_{10-x}Na_x(PO_4)_{6-x}(CO_3)_x(OH)_2$ In accordance with at least selected possibly preferred embodiments, the present invention is directed to battery separators having one or more PIMS minerals as a filler component, battery separators having one or more fish bone or fish meal fillers, polyethylene and silica battery separators having fish bone powder substituted for at least a portion of the silica filler, and/or methods of manufacture or use thereof.

With reference to FIGS. 1 to 9 of the drawings, non-limiting embodiments or examples of a battery, battery separators, and a separator production process are shown. The inventive embodiments or aspects of the present invention are not limited to the particular battery, separators, or production process shown in the drawings.

Referring to the drawings wherein like elements have like reference numerals, there is shown in FIG. 1 an illustration of an exemplary lead acid battery 10, for example, a flooded lead acid SLI battery. Battery 10 includes a negative plate (electrode) 12 and a positive plate (electrode) 16 with an exemplary possibly preferred separator 14 sandwiched there between. These components are housed within a container 18 that also includes terminal posts 20, vents 22, and gang-vent plugs 24. The separator 14 has transverse ribs 52 on the surface 54 that faces negative plate 12 and has longitudinal ribs 56 on the surface 58 that faces positive plate 16 (see, for example, FIGS. 1, 4 and 5). Although a particular battery is shown, the inventive separator may be used in many different types of batteries or devices including for example, but not limited to, sealed lead acid, flooded lead acid, ISS lead acid, combined battery and capacitor units, other battery types, capacitors, accumulators, and/or the like.

Figure 4:
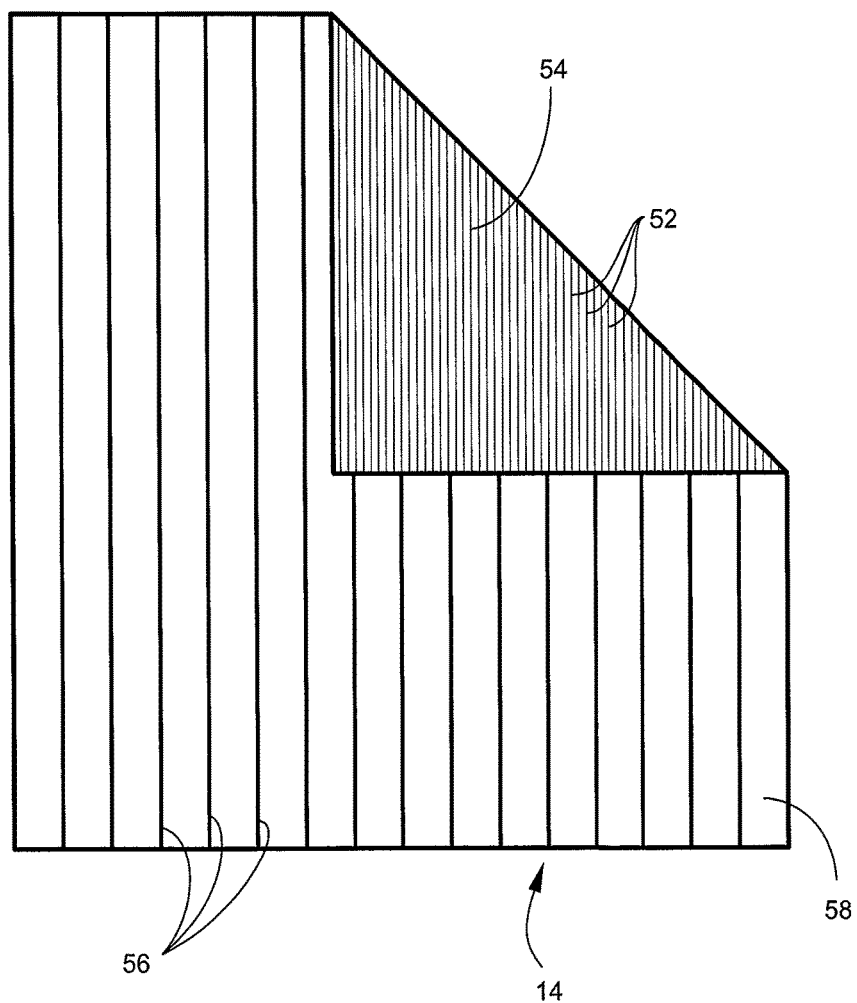
FIG. 4 is a front plan view illustration of at least one embodiment of the separator of FIG. 1, with a part folded over.
Figures 5, 5A:
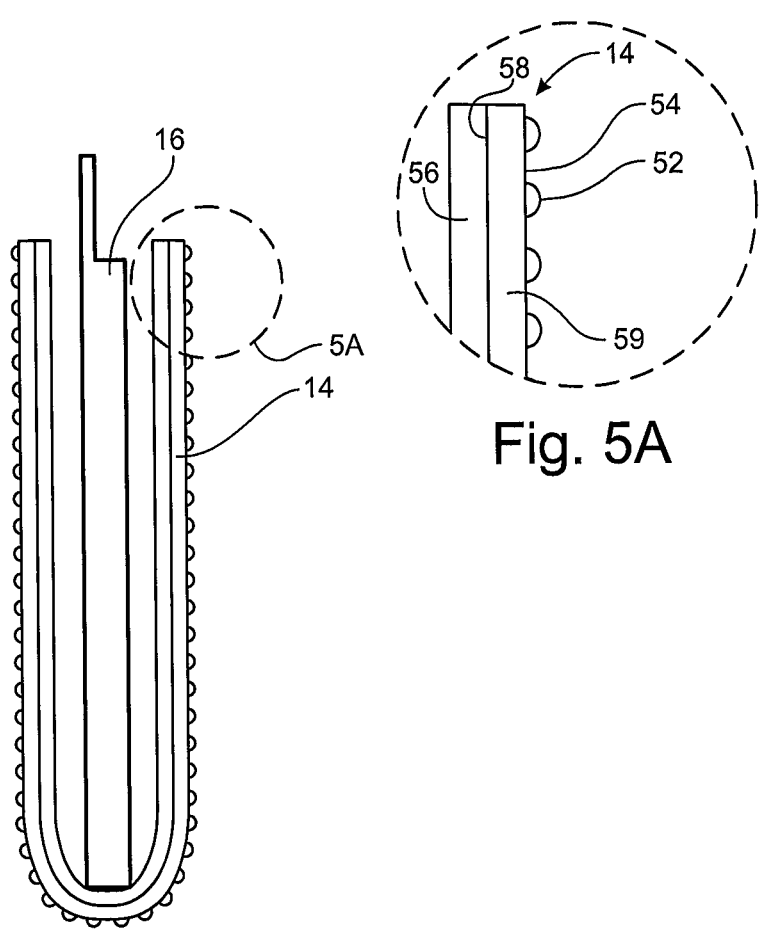
FIG. 5 is a schematic cut-away side elevation view illustration of at least one embodiment of the separator of the instant invention, with the separator folded over a positive plate and forming an envelope or pocket about the plate.
FIG. 5A is an enlarged detail view of a portion of the separator of FIG. 5.

The possibly preferred separator 14, of FIGS. 1, 4 and 5, is preferably a porous polymer membrane (such as a microporous polyethylene membrane having pores less than about 1 micron). Nevertheless, the inventive separators may be microporous or macroporous membranes (having pores greater than about 1 micron) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The possibly preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, ultrahigh molecular weight polyethylene (UHMWPE), and polypropylene. One preferred embodiment may include a mixture of filler (for example, silica and/or reactive mineral) and UHMWPE. In general, the preferred separator precursor may be made by mixing, in an extruder, about 30% by weight filler with about 10% by weight UHMWPE, and about 60% processing oil. The mixture may also include minor amounts of other additives or agents as is common in the separator arts (such as wetting agents, colorants, antistatic additives, and/or the like) and is extruded into the shape of a flat sheet. The ribs are preferably formed by the engraved surfaces of opposed calender rollers (see FIG. 9). Thereafter, much of the processing oil is extracted, and the microporous membrane is formed.

Separator 14 preferably includes a backweb 59, a positive electrode side 58 and a negative electrode side 54. The positive electrode side or face 58 preferably includes a plurality of longitudinally extending major ribs 56. Major ribs 56 may be any pattern including for example, see FIG. 4, spaced longitudinal ribs on one face of the separator. Also, as is known in separators, in the areas to be folded over and sealed or joined, the ribs 56 may be shorter or eliminated to provide for a good seal or weld.

The negative electrode side or face 54 (technical back) preferably includes a plurality of transversely extending ribs 52 (negative cross ribs), see FIG. 4, the part folded over, or FIGS. 1, 5 and 5A. In general, transversely extending ribs 52 include any substantially transverse or non-longitudinal rib pattern (such rib patterns would apparently block or impede the escape of gases formed at the negative electrode during charging (or over charging)). Non-limiting examples of these rib patterns include: continuous (i.e., side-to-side) linear ribs 52 of side 54 of separator 14, FIGS. 1, 4, and 5; cross-hatched (diagonal, diamond or knurled); sinusoidal or wavy continuous; wavy discontinuous; or intermittent and registered linear. Other rib patterns which include variations of the foregoing are also included.

With reference again to FIGS. 1, 5 and 5A of the drawings, the separator 14 may be folded over the positive plate or electrode 16 with positive ribs 56 contacting plate 16 and negative ribs 52 facing outwardly toward a negative plate 12 (to form a pocket or envelope). In accordance with one particular example, cross ribs 52 are about 4 mils thick, backweb 59 is about 6 mils thick and positive ribs 56 are about 20 mils thick (total separator thickness about 30 mils).

With reference to FIGS. 1 and 5, the preferred separator 14 may be a cut piece separator or a wrapping, envelope, pouch, pocket, or laminate with glassmat or synthetic nonwoven type separator, and have minor transverse cross-ribs on the opposite face of the separator as the major longitudinal ribs.

The transverse cross-ribs on the opposite face of the separator as the longitudinal ribs increase stiffness and protection of the sheet allowing for reduction of mass of the back-web, reduced ER, reduced cost, and increased physical properties such as may be required for high speed production and assembly (including high speed separator, envelope, and/or battery production and/or assembly). Such separators or precursors can be produced in rolls, envelopes (or pockets) and pieces, and may be used where processing of separators by high speed automation or hand assembly is utilized and high productivity is desired.

Also, the mass of the separator can be reduced while maintaining physical properties needed for processing and performance inside the battery by adding transverse or cross ribs opposite, for example, the major longitudinal ribs. The mass of the major rib is preferably reduced when the cross ribs are added to the opposite side to achieve the desired overall separator thickness (major rib+backweb+cross rib). The sheet can also be reduced in thickness and/or mass while maintaining productivity properties such as rigidity as well as protecting the sheet from abrasion and oxidation rips and tears during the life of the battery by adding transverse or cross ribs.

In accordance with at least one example or embodiment, small, tightly spaced transverse ribs are added to the side of the lead acid separator which contacts the negative electrode (preferably in addition to major ribs on the positive side). The small, tightly spaced negative transverse ribs can be in many different forms, as seen for example in FIGS. 6 to 8, including without limitation, sinusoidal, diagonal or straight rib patterns, that are continuous or discontinuous. For ease of processing, the rounded straight ribs of FIGS. 5 and 6 to 8 may be preferred.

The positive longitudinal major ribs can take many forms that run substantially in the longitudinal directional, for example, sinusoidal, diagonal or straight ribs, that are continuous or discontinuous. For ease of processing, the rounded straight ribs of FIGS. 6 to 8 may be preferred. In certain battery designs, often referred as the Japanese Design, there are no positive ribs, instead they are replaced with a heavy glass-mat laminated to the flat positive face of the separator. In this glass-mat positive face separator embodiment, the transverse negative ribs of the present invention function in the same fashion as the embodiments with positive longitudinal ribs. The positive face may be smooth or flat, have projections, have ribs, or have a nonwoven bonded or laminated thereto. Such nonwoven materials may be formed of synthetic, natural, organic or inorganic materials or blends, such as fiberglass, polyester (PET), recycled PET, or combinations thereof (with or without the inventive reactive minerals). The separator may be a cut piece separator or a wrap, envelope, pouch, or pocket type separator.

With regard to at least selected particular embodiments or examples of separators, separator 14 preferably has the following:
1) Transverse Rib Height—preferably between about 0.02 to 0.30 mm, and most preferably between about 0.075 to 0.15 mm.
2) Sheet (Substrate) Thickness—preferably between about 0.065 to 0.75 mm.
3) Overall Thickness (positive rib+backweb+negative rib)–overall thickness of the separator preferably between about 0.200 to 4.0 mm.
4) Mass Reduction—preferably greater than 5%, more preferably greater than 10%. The transverse ribs increase the transverse rigidity of the separator and allow for the backweb or substrate thickness to be decreased. Mass can be removed from both the backweb and positive ribs while maintaining and increasing the transverse rigidity. Also, the transverse negative ribs contribute to overall thickness of the separator. Therefore the height of the longitudinal positive rib can be directly reduced by the height of the negative cross rib.
5) Type of Separator—the separator can be made of porous materials, such as microporous or macroporous thermoplastic material, preferably polyethylene, polypropylene, polyvinyl chloride, and the mixtures thereof, as well as of rubber, polyolefin, phenolic, crosslinked phenolic resin, cellulosic, glass, or combinations thereof.

Additional or alternative benefits of the addition of negative cross ribs include:
1) Electrical Resistance Reduction—Since the negative cross rib profile design allows for mass removal while maintaining equivalent or higher transverse bending stiffness, the observed electrical resistance will preferably be lower.
2) Minimize Tear Propagation—When the separator is extremely oxidized, a crack or split will likely develop in the backweb and extend parallel to the major longitudinal rib. The negative cross rib will preferably arrest the propagation of such tears due to, for example, the extra mass in the ribs.
3) Side Alignment—In the assembly process, the enveloped plates are aligned horizontally and vertically before the strap is cast to connect the positive and negative electrodes respectively. For vertical alignment, the positive ribs provide a means for the separator and plate to slide when contacting each other. For typical side alignment, the negative plate may slide when contacting the flat backweb. The negative transverse ribs, will preferably offer less surface and should aid in side alignment operation.

In accordance with at least one embodiment, the separator is made up of an ultrahigh molecular weight polyethylene (UHMWPE) mixed with a processing oil and filler of precipitated silica and/or reactive mineral. In accordance with at least one particular embodiment, the negative cross ribs preferably have a 2 to 6 mil radius and a 10 to 50 mil rib spacing.

In accordance with at least selected embodiments, the battery separator includes a porous membrane having a backweb and at least two rows of positive ribs on the positive side of the backweb, and a plurality of negative cross ribs or transverse ribs on the negative side of the backweb. The positive ribs may be straight or wavy, may have a solid portion, and may have a truncated pyramidal shape. The membrane may be selected from the group of polyolefin, rubber, polyvinyl chloride, phenolic, cellulosic, or combinations thereof, and the membrane is preferably a polyolefin material forming a battery separator for a storage battery.

A battery separator is used to separate the battery's positive and negative electrodes, and is typically microporous so that ions may pass there through to the positive and negative electrodes. In lead/acid storage batteries, either automotive or industrial batteries, the battery separator is typically a microporous polyethylene separator having a back web and a plurality of positive ribs standing on the back web. The separators for automotive batteries are typically made in continuous lengths and rolled, subsequently folded, and sealed along its edges to form pouches that receive the electrodes for the batteries. The separators for industrial (traction) batteries are typically cut to a size about the same as an electrode plate (piece separator).

In one embodiment of the present method of making a lead/acid battery separator from a sheet of plastic material, the sheet is calender molded to form cross or negative side transverse ribs or projections, and preferably is calender molded to simultaneously form both positive longitudinal ribs and negative cross or transverse ribs on opposite sides of the sheet.

Figure 3:
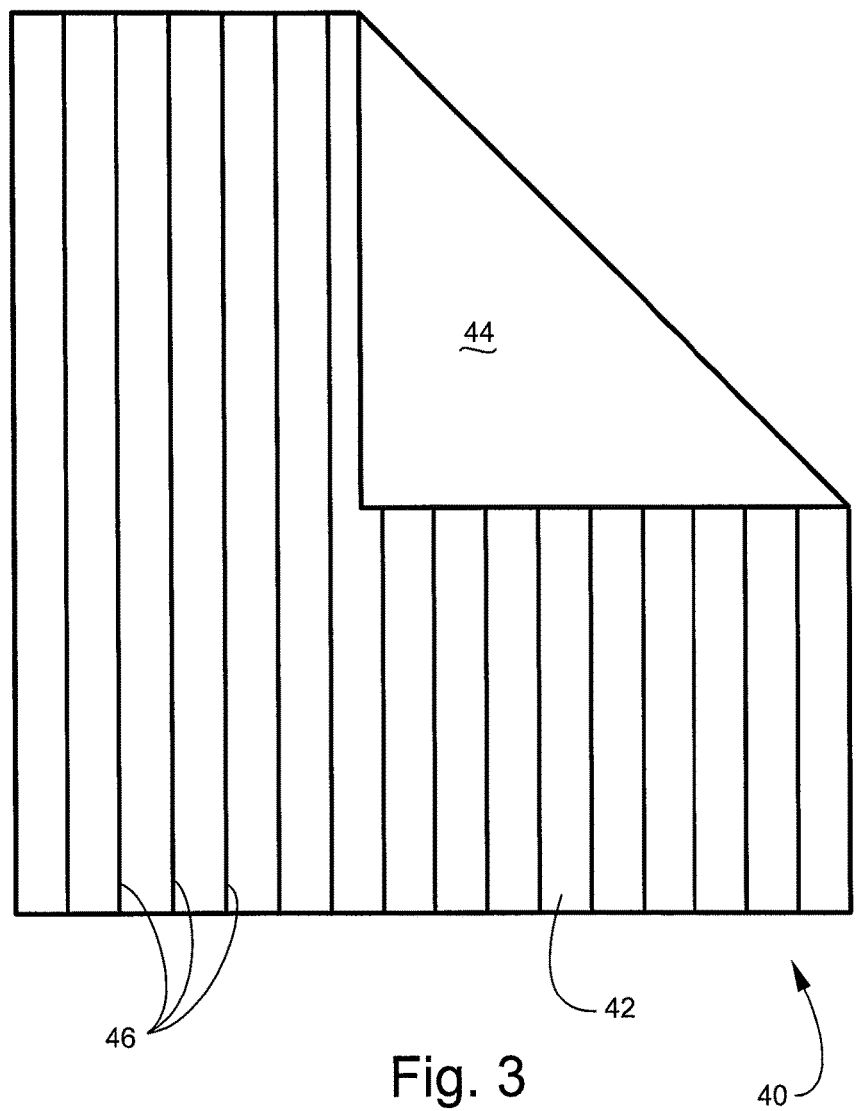
FIG. 3 is a front plan view illustration of another exemplary separator for a lead acid battery, with a part folded over.
Figure 6:
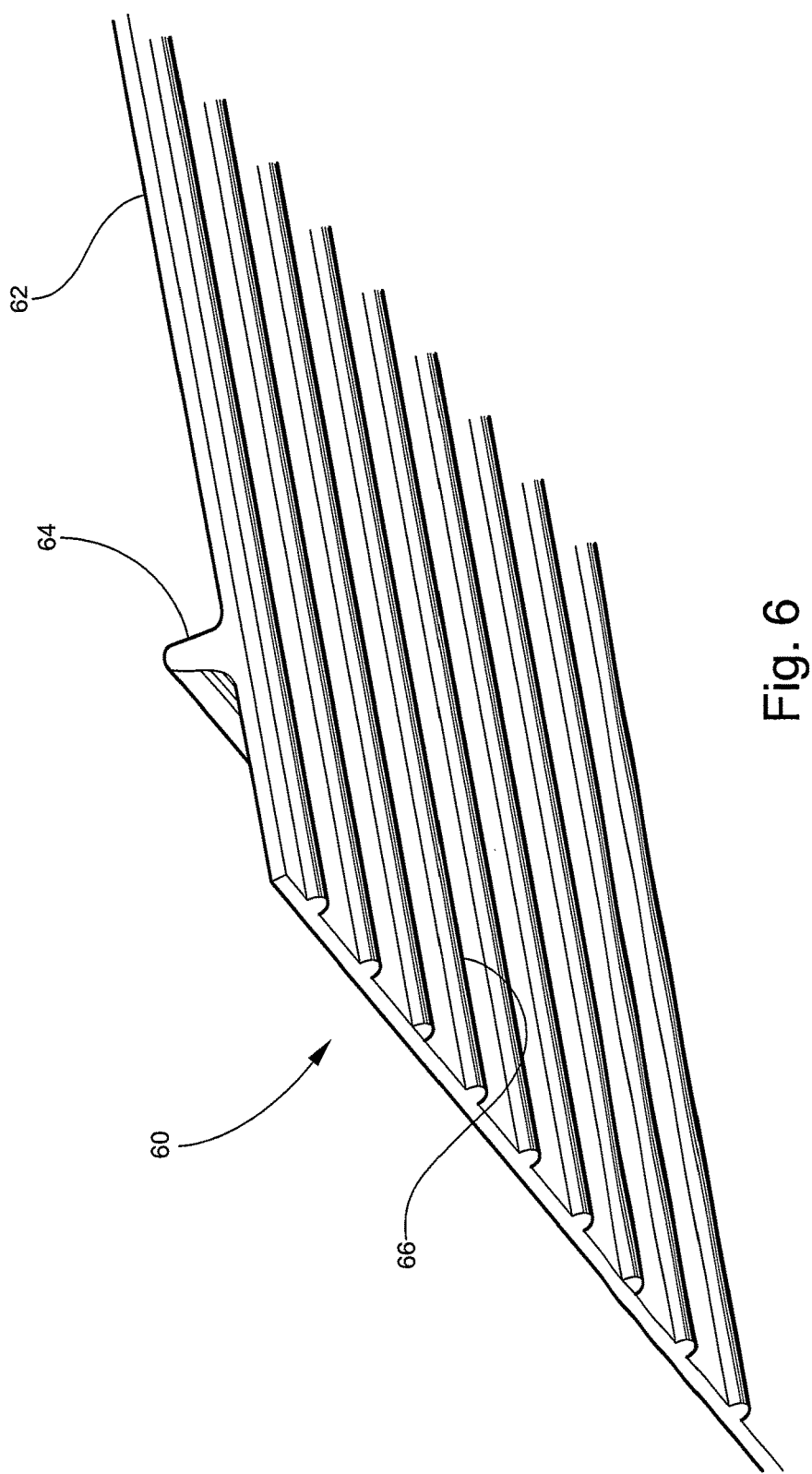
FIGS. 6-8 are respective schematic perspective view illustrations of selected particular embodiments of separators with negative cross ribs of the instant invention.
Figure 7:
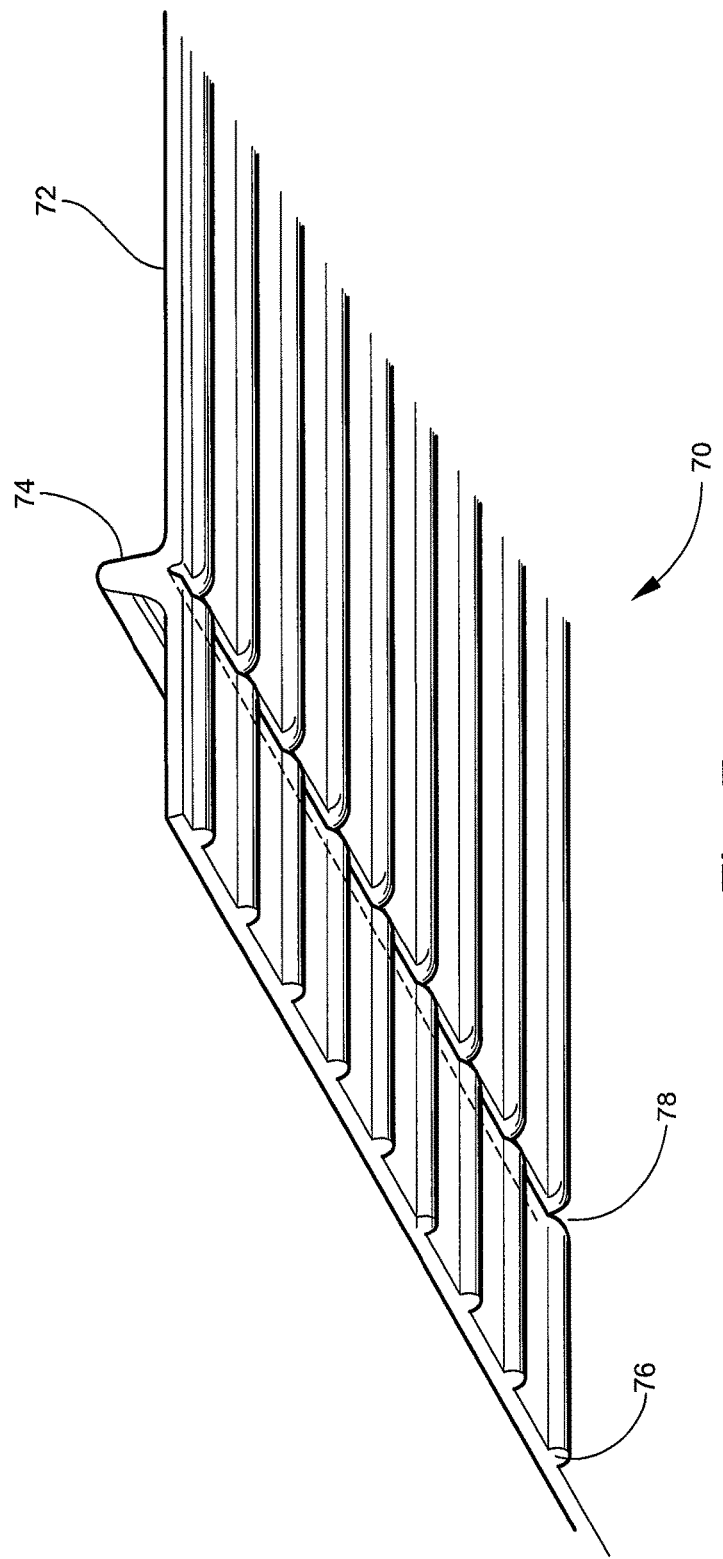
Figure 8:
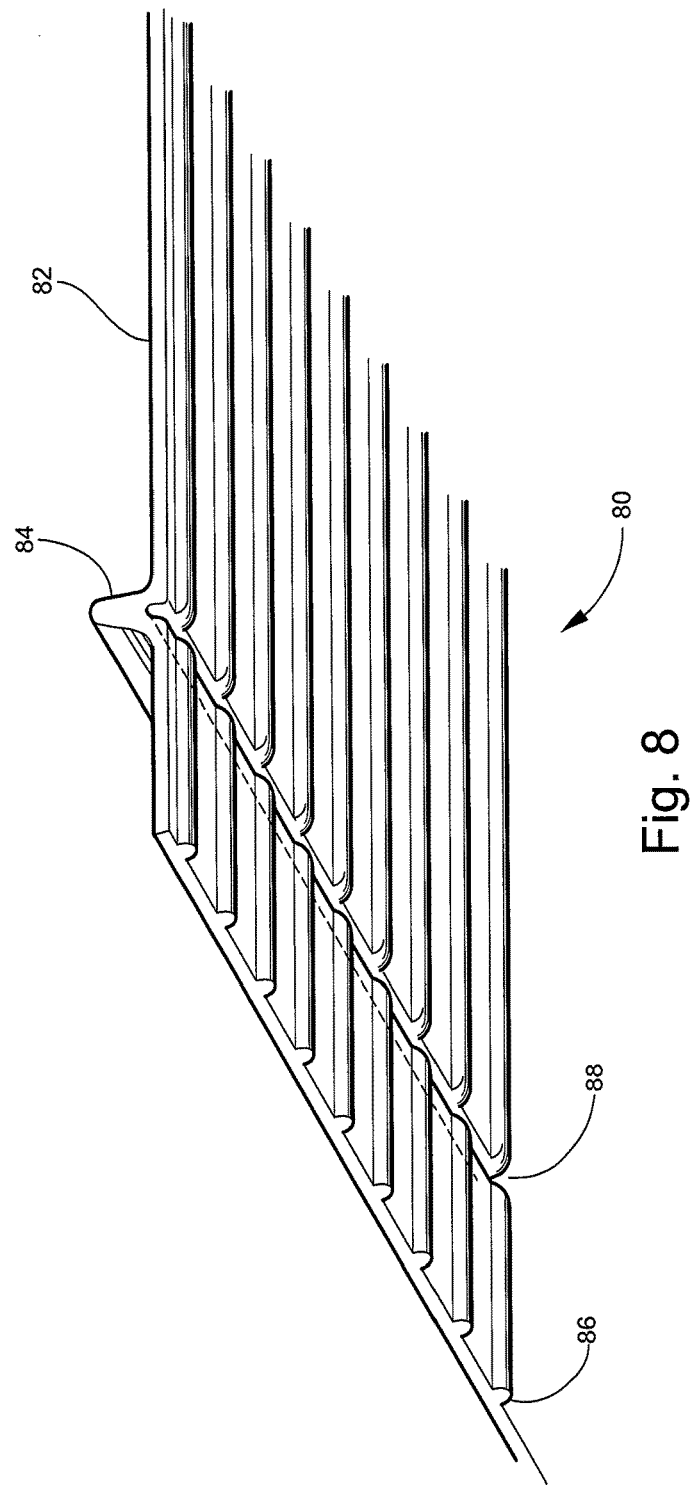

With reference to FIG. 3, an exemplary lead/acid battery separator 40 has a ribbed positive face 42 (i.e., with the primary ribs 46) and a smooth back face 44 (i.e., without ribs). The negative electrode (plate) is placed adjacent to the back face, and the positive electrode (plate) rests on the ribs 46 of the ribbed face 42. Once a battery is sufficiently charged and current is continually applied (i.e., overcharging), hydrogen is generated at the negative plate, and oxygen is generated at the positive plate. As hydrogen is formed at the negative plate, it may push the separator away from the negative plate thereby forming a gas pocket which may prevent the escape of gas. At least selected embodiments of the present invention may address this issue and provide an improved battery separator. See for example, FIGS. 6 to 8 of the drawings showing three selected separator embodiments. In FIG. 6, an exemplary separator 60 has a backweb 62, positive major ribs 64 and minor negative cross ribs 66. The negative cross ribs extend across the back or negative surface. In FIG. 7, an exemplary separator 70 has a backweb 72, positive major ribs 74 and minor negative cross ribs 76. The negative cross ribs extend across the back or negative surface and are interrupted by shallow fissures or recesses 78 behind each positive rib 74. These fissures 78 form channels which may provide for the escape of hydrogen gas, allow for extraction of plasticizer or lubricant from the positive ribs, and/or the like. In FIG. 8, an exemplary separator 80 has a backweb 82, positive major ribs 84 and minor negative cross ribs 86. The negative cross ribs extend across the back or negative surface and are interrupted by fissures or recesses 88 behind each positive rib 84. These fissures 88 form channels which may extend up into the positive rib, may provide for the escape of hydrogen gas, may allow for extraction of plasticizer or lubricant from the positive ribs, and/or the like. A separator having such channels that allow any hydrogen gas to escape, may be preferred.

In at least one embodiment, the separator is made of a microporous, thermoplastic material which is provided with longitudinal positive ribs and transverse negative ribs with the height of at least a majority of the longitudinal ribs being greater than that of the transverse ribs, and the longitudinal and transverse ribs being solid ribs which are formed integrally from the plastic, characterized in that the transverse ribs extend across substantially the entire back width of the separator. The separator sheet thickness may be approximately 0.10 to 0.50 mm, the height of the longitudinal ribs may be 0.3 to 2.0 mm and the height of the transverse ribs may be 0.1 to 0.7 mm, the longitudinal rigidity with 100 mm width may be approximately 5 mJ and the transverse rigidity may be approximately 2.5 mJ, and the total thickness of the separator may be less than 2.5 mm.

Figure 9:
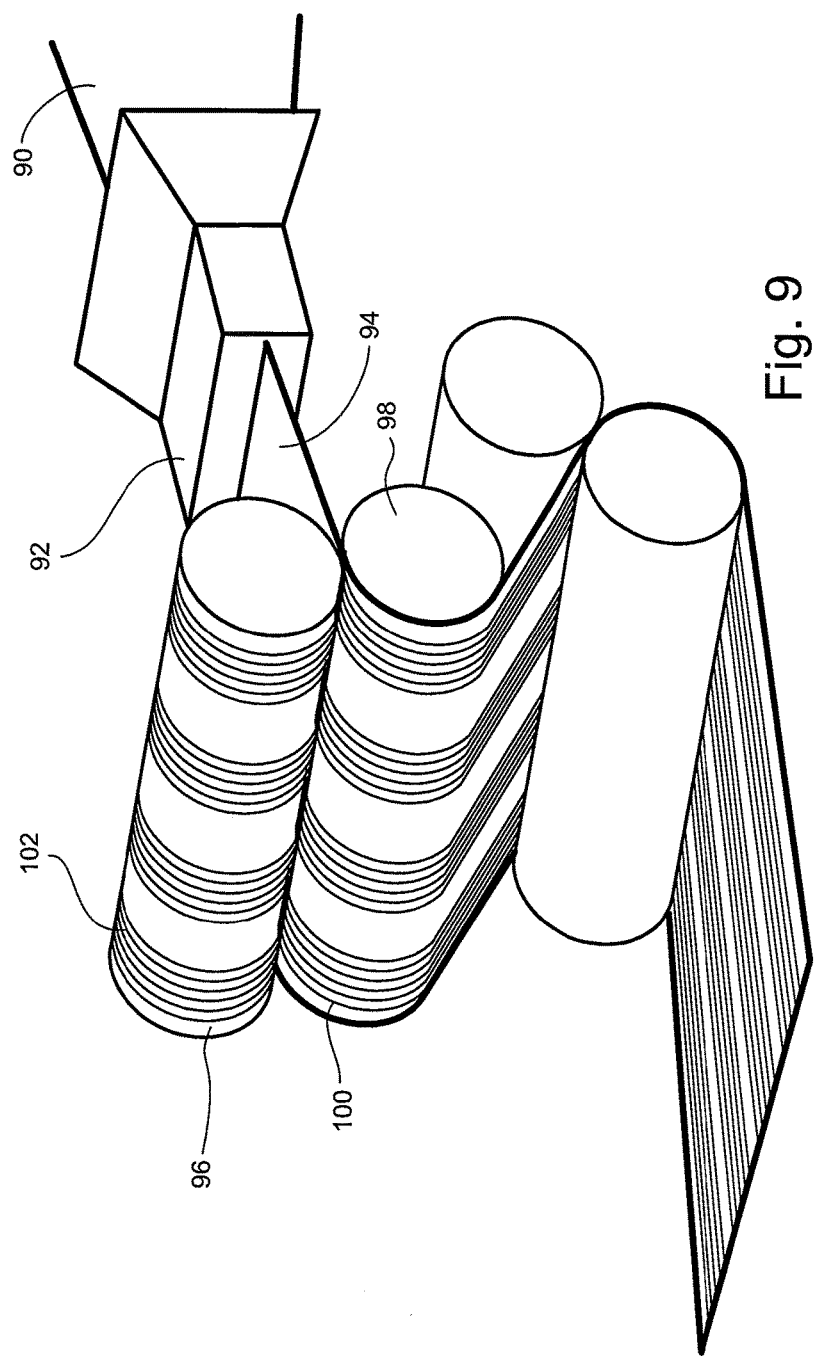
FIG. 9 is a schematic perspective view illustration of at least a selected embodiment of the manufacture of at least one embodiment of the inventive separator of the present invention.

With reference to FIG. 9 of the drawings, the separators according to the present invention can be manufactured in a similar fashion as conventional polyethylene separators with the addition or substitution of reactive mineral fillers, a negative roll having grooves to form the negative cross ribs, a positive roll having no grooves or grooves of less depth, and/or the like. With this preferred method, the plastic material 90 containing filler is extruded through a slot die 92 to form a film 94 and then run through two calender rolls (positive roll 96, negative roll 98) by means of which both the positive longitudinal ribs 100 and the negative transverse ribs are produced and the separator sheet is reduced to the desired thickness. With reference again to FIG. 9, positive roll 96 has shallow circumferential or annular grooves 102 which form positive longitudinal ribs 100, and lands or smooth areas or stripes that form smooth areas on the separator for sealing the edges of the pockets. The negative roll 98 has shallow axial grooves which form the cross ribs. Also, the negative roll 98 may have spaced sets of shallow axial grooves with smooth lands or areas (for example, for welding zones) there between.

The separators according to the present invention with negative cross ribs preferably have a better machine workability than those without such transverse ribs, a better guidance of the separator tracks as a result of increased transverse rigidity, and the processability for placing the electrode plates in pockets should be improved because of the increased transverse rigidity. In addition, production of separators with a considerably reduced sheet thickness and consequently with a reduced electrical resistance should be possible which is of significance particularly in relation to efforts to constantly increase battery output with a constant battery volume. The separators according to the invention should be able to be processed to form pockets without difficulty on conventional machines. The additional transverse negative ribs should not cause problems either with the welding of the pockets by the use of heat or ultrasonic means or with the mechanical process for producing pockets.

In at least one particular embodiment, the separator made of elastic plastic and suitable for use in a lead acid storage battery, includes sheet material with an inner region and two peripheral regions and having positive ribs running in the longitudinal direction with the longitudinal ribs in the inner region being more widely spaced than those in the peripheral region, and having negative ribs running in the transverse direction.

Figure 2:
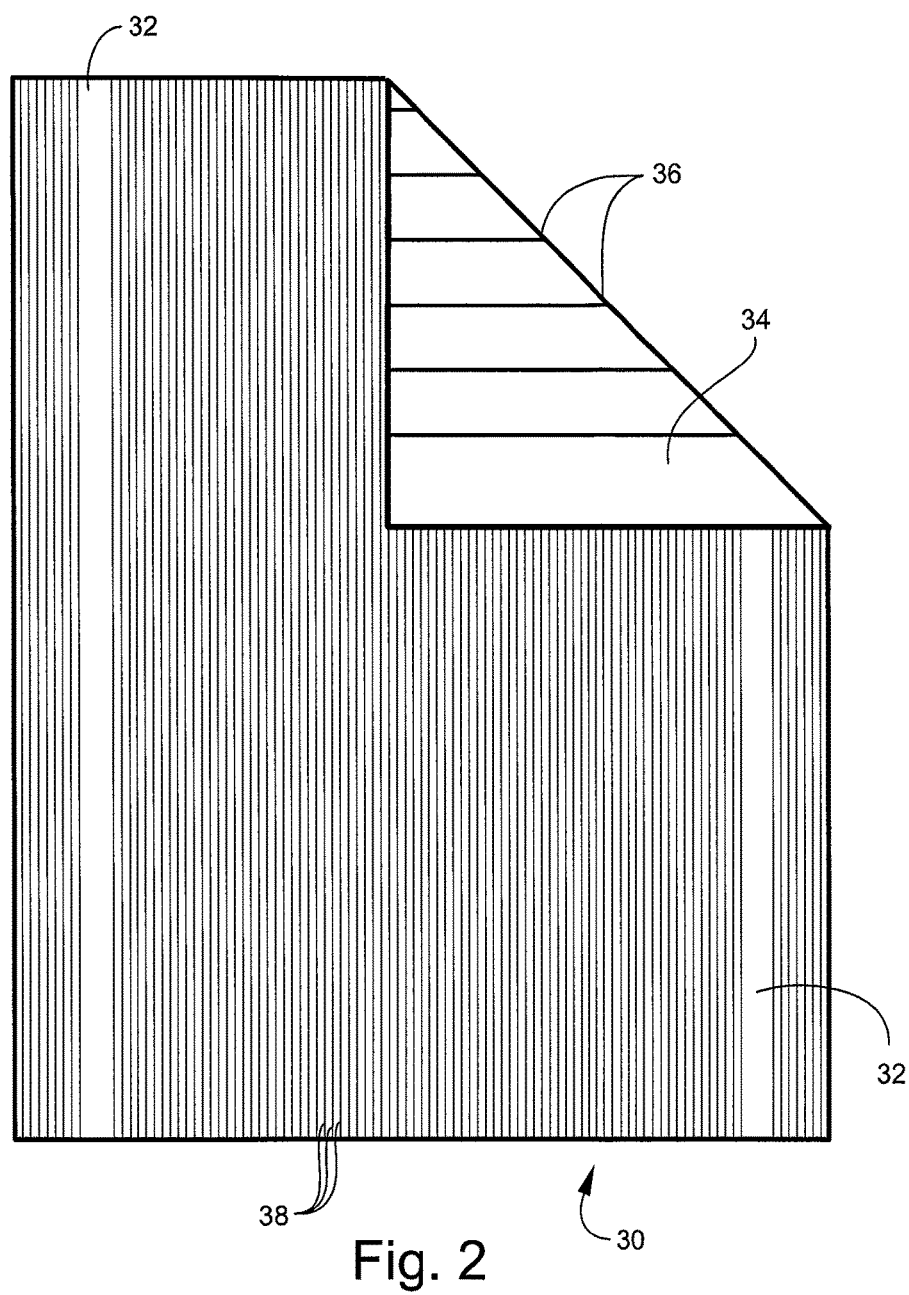
FIG. 2 is a back plan view illustration of an exemplary separator for a lead acid battery, with a part folded over.

Referring to FIG. 2, another exemplary separator 30 is illustrated. Separator 30 has a negative electrode side 32 and a positive electrode side 34 (the part folded over). The positive electrode side 34 includes a plurality of longitudinally extending major ribs 36. The negative electrode side 32 includes a plurality of longitudinally extending minor ribs 38. One difference between major ribs 36 and minor ribs 38 is their height, major ribs 36 being greater in height than minor ribs 38. Another difference is the spacing between the ribs, major ribs 36 being more spaced apart than minor ribs 38.

Referring again to FIG. 3, the separator 40 has a positive electrode side 42 and a negative electrode side 44. The positive electrode side 42 includes a plurality of longitudinally extending ribs 46. The negative electrode side 44 (the part folded over) has no ribs.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least one of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least two of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least three of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least four of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and each of housing, separator, positive electrode, negative electrode, and electrolyte include at least one natural or synthetic hydroxyapatite mineral.

The new or improved separators of the present invention may find use as Lead-Acid Battery Separators, separators for use in starting, deep-cycling and stand-by power battery applications, or in Flooded, Gel and AGM battery types used in applications such as: starting, stationary, motive power and deep-cycle lead-acid battery applications, as well as for flooded and specialty lead-acid battery applications, and/or for premium lead-acid gel batteries. Further, such separators may be used in other batteries, accumulators, capacitors, and/or the like.

In accordance with at least certain embodiments, it is preferred that at least one source of hydroxyapatite mineral (such as ground fish meal) be added to substitute for a portion of the silica filler in a silica filled separator at substitution levels of about 1% to 50% of the silica, more preferably about 5% to 30%, and most preferably at about 10% to 20%.

In accordance with at least other certain embodiments, it is preferred that at least one source of hydroxyapatite (such as ground fish meal) be added as the filler in a filled separator at filler levels of about 1% to 75% filler, more preferably about 5% to 50%, and most preferably at about 10% to 30%.

In accordance with at least still other certain embodiments, it is preferred that at least one source of hydroxyapatite (such as ground fish meal) be added as filler in a battery separator at levels of about 1% to 75% weight percent of the separator, more preferably about 2% to 35%, and most preferably at about 5% to 20%.

In accordance with at least selected embodiments of the present invention, a believed novel concept of utilizing PIMS minerals as a filler component within a microporous lead-acid battery separator is provided. In accordance with one particular embodiment or example, the PIMS mineral (preferably fish meal, a bio-mineral) is provided as at least a partial substitution for the silica filler component in a silica filled lead acid battery separator (preferably a polyethylene/silica separator formulation).

In accordance with at least certain embodiments of the present invention, a novel concept of utilizing one or more natural or synthetic PIMS minerals as a filler component within a microporous lead-acid battery separator is provided. In accordance with more particular embodiments or examples, a PIMS mineral (preferably fish meal, a bio-mineral) is provided as at least a partial substitution for the silica filler component in a silica filled lead acid battery separator (preferably a polyethylene/silica separator formulation). In accordance with at least selected embodiments, the present invention is directed to new or improved batteries, separators, components, and/or compositions having heavy metal removal capabilities and/or methods of manufacture and/or methods of use thereof.

The present invention may be embodied in other forms without departing from the spirit and the essential attributes thereof, and, accordingly, reference should be made to the appended claims, rather than to the foregoing specification, as indicating the scope of the invention.

The invention claimed is:

1. A lead acid battery separator having a front face and a reverse face, the separator comprising
    a porous, silica filled, polymer membrane having a backweb with integral ribs, wherein the ribs comprise of positive ribs on the front face, and a plurality of negative cross ribs on the reverse face, and
    wherein the polymer membrane further comprises apatite particles and/or hydroxyapatite particles, said particles binding at least a portion of heavy metal, said heavy metal including lead.

2. The battery separator of claim 1, wherein the positive ribs are longitudinal ribs.

3. The battery separator of claim 2, wherein the negative cross ribs are shorter and more tightly spaced than the longitudinal ribs.

4. The battery separator of claim 1, wherein the negative cross ribs have a spacing of from 0.254 mm to 1.27 mm.

5. The battery separator of claim 1, wherein the negative cross ribs have a radius of from 0.0508 mm to 0.152 mm.

6. The battery separator of claim 3, wherein the negative cross ribs are transversely extending.

7. The battery separator of claim 1, wherein the negative cross ribs comprise fissures or recesses to form channels in the separator.

8. The battery separator of claim 1, wherein the separator has an overall thickness of from 0.2 to 4 mm.

9. The battery separator of claim 1, wherein the particles have a $D_{50}$ particle size from 10 microns to 80 microns.

10. The battery separator of claim 1, wherein the separator is a porous polyethylene and silica filled battery separator having the particles substituted for at least a portion of the silica filler.

11. In a battery, the improvement comprising the battery separator of claim 1.

12. The battery according to claim 11, wherein the battery is a flooded lead acid battery.

13. The battery according to claim 11, wherein the battery is an enhanced flooded lead acid battery (EFB).

14. In a battery, the improvement comprising the battery separator of claim 3.

15. The battery according to claim 14, wherein the battery is a flooded lead acid battery.

16. In a battery, the improvement comprising the battery separator of claim 6.

17. The battery according to claim 16, wherein the battery is a flooded lead acid battery.

18. The lead acid battery separator of claim 1,
wherein the positive ribs are longitudinal ribs, the negative cross ribs are shorter and more tightly spaced than the longitudinal ribs, and the negative cross ribs are transversely extending.

* * * * *